(12) United States Patent
Oshima et al.

(10) Patent No.: US 12,107,506 B2
(45) Date of Patent: Oct. 1, 2024

(54) POWER SUPPLY APPARATUS AND IMAGE FORMING APPARATUS

(71) Applicant: CANON KABUSHIKI KAISHA, Tokyo (JP)

(72) Inventors: Mitsunori Oshima, Shizuoka (JP); Junya Kobayashi, Shizuoka (JP); Masaki Inagaki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 249 days.

(21) Appl. No.: 17/734,557

(22) Filed: May 2, 2022

(65) Prior Publication Data

US 2022/0368237 A1    Nov. 17, 2022

(30) Foreign Application Priority Data

May 13, 2021 (JP) ................................. 2021-081568

(51) Int. Cl.
*H02M 3/335* (2006.01)
*H02M 1/00* (2007.01)

(52) U.S. Cl.
CPC ...... *H02M 3/33523* (2013.01); *H02M 1/0006* (2021.05); *H02M 1/0051* (2021.05)

(58) Field of Classification Search
CPC ............. H02M 1/0006; H02M 1/0051; H02M 1/0064; H02M 1/32; H02M 3/335–33592; G03G 15/5004; Y02B 70/10
See application file for complete search history.

(56) References Cited

U.S. PATENT DOCUMENTS

| 9,621,053 | B1* | 4/2017 | Telefus ............ H02M 3/33507 |
| 9,787,205 | B2 | 10/2017 | Kobayashi |
| 10,411,606 | B2 | 9/2019 | Oshima |
| 10,536,084 | B2 | 1/2020 | Kobayashi |
| 11,079,832 | B2 | 8/2021 | Hirano |

(Continued)

FOREIGN PATENT DOCUMENTS

| JP | 2004-274847 A | 9/2004 |
| JP | 2009-232509 A | 10/2009 |
| JP | 2019-221101 A | 12/2019 |

OTHER PUBLICATIONS

U.S. Appl. No. 17/834,379, filed Jun. 7, 2022, by Masaki Inagaki.

*Primary Examiner* — Fred E Finch, III
(74) *Attorney, Agent, or Firm* — VENABLE LLP

(57) ABSTRACT

A power supply apparatus includes a transformer including a primary coil, a secondary coil, and an auxiliary coil; a switching element connected in series to the primary coil; a first rectifying/smoothing circuit including a first diode and a first capacitor and configured to rectify and smooth a voltage induced in the auxiliary coil; a second rectifying/smoothing circuit including a second diode and a second capacitor, connected in parallel with the first rectifying/smoothing circuit, and configured to rectify and smooth the voltage induced in the auxiliary coil; and a controller configured to control the switching element. The controller is configured to detect the voltage induced in the auxiliary coil based on an output voltage of the first rectifying/smoothing circuit. A responsiveness of the second diode is better than a responsiveness of the first diode.

30 Claims, 5 Drawing Sheets

(56) References Cited

U.S. PATENT DOCUMENTS

| | | | |
|---|---|---|---|
| 2002/0186571 A1* | 12/2002 | Tsuge | H02M 3/3385 363/21.01 |
| 2008/0278134 A1* | 11/2008 | Murata | H02M 1/32 323/284 |
| 2019/0131879 A1* | 5/2019 | Oshima | G01R 19/16547 |
| 2024/0128875 A1* | 4/2024 | Bonavente | H02M 1/007 |

* cited by examiner

POWER SUPPLY APPARATUS AND IMAGE FORMING APPARATUS

BACKGROUND OF THE INVENTION

Field of the Invention

The present invention relates to a power supply apparatus and an image forming apparatus, and for example, to a voltage detection function of a switching power supply.

Description of the Related Art

In a switching power supply configured to convert an AC (alternating current) voltage such as a commercial AC power supply into a DC (direct current) voltage, a voltage of an AC power supply (hereafter referred to as an AC voltage) may be detected in order to control an output voltage and to protect the switching power supply itself. In order to detect the AC voltage, there is a method in which a voltage proportional to an AC voltage induced in an auxiliary coil provided in a transformer is rectified and smoothed to detect the AC voltage. However, in the auxiliary coil of the transformer, a voltage in which a noise component generated in a switching operation of a switching element is superimposed on the voltage proportional to the AC voltage is induced. Therefore, in the method of rectifying and smoothing the voltage of the auxiliary coil, there has been a disadvantage that an error occurs in the detection result of the AC voltage.

In order to reduce the error of the detection result of the AC voltage due to the noise component generated during the switching operation of the switching element, a method disclosed in Japanese Patent Application Laid-Open No. 2004-274847 has been proposed. That is, the method has been proposed in which a reverse recovery time of a diode used in a rectifying circuit for the auxiliary coil is specified not to rectify the noise component so that the detection accuracy of the AC voltage is increased.

However, if the noise component is to be removed by the conventional method, the diode having a much longer reverse recovery time than a general rectifying diode must be used. Therefore, the conventional method has a disadvantage that a sufficient effect may not always be obtained depending on a voltage value and frequency of the noise component. There is also a disadvantage that the use of the diode having the long reverse recovery time increases a power loss in the diode. Therefore, it is required to improve the accuracy of voltage detection without increasing the power loss.

SUMMARY OF THE INVENTION

It is an object of the invention to improve the accuracy of voltage detection without increasing power loss.

In order to solve the above difficulties, according to an embodiment, a power supply apparatus, comprises:
a transformer including a primary coil, a secondary coil, and an auxiliary coil;
a switching element connected in series to the primary coil;
a first rectifying/smoothing circuit including a first diode and a first capacitor and configured to rectify and smooth a voltage induced in the auxiliary coil;
a second rectifying/smoothing circuit including a second diode and a second capacitor, connected in parallel with the first rectifying/smoothing circuit, and configured to rectify and smooth the voltage induced in the auxiliary coil; and
a controller configured to control the switching element, wherein the controller is configured to detect the voltage induced in the auxiliary coil based on an output voltage of the first rectifying/smoothing circuit, and
wherein a responsiveness of the second diode is better than a responsiveness of the first diode.

According to an embodiment, an image forming apparatus comprises:
an image forming unit configured to form an image on a recording material; and
a power supply apparatus configured to supply power to the image forming unit, the power supply apparatus comprising:
a transformer including a primary coil, a secondary coil, and an auxiliary coil,
a switching element connected in series to the primary coil,
a first rectifying/smoothing circuit including a first diode and a first capacitor and configured to rectify and smooth a voltage induced in the auxiliary coil,
a second rectifying/smoothing circuit including a second diode and a second capacitor, connected in parallel with the first rectifying/smoothing circuit, and configured to rectify and smooth the voltage induced in the auxiliary coil, and
a controller configured to control the switching element, wherein the controller detects the voltage induced in the auxiliary coil based on an output voltage of the first rectifying/smoothing circuit, and
wherein a responsiveness of the second diode is better than a responsiveness of the first diode.

Further features of the present invention will become apparent from the following description of exemplary embodiments with reference to the attached drawings.

DESCRIPTION OF THE EMBODIMENTS

Hereinafter, the embodiments of the present invention will be described in detail with reference to the drawings.

First Embodiment

[Image Forming Apparatus]

Figure 1:
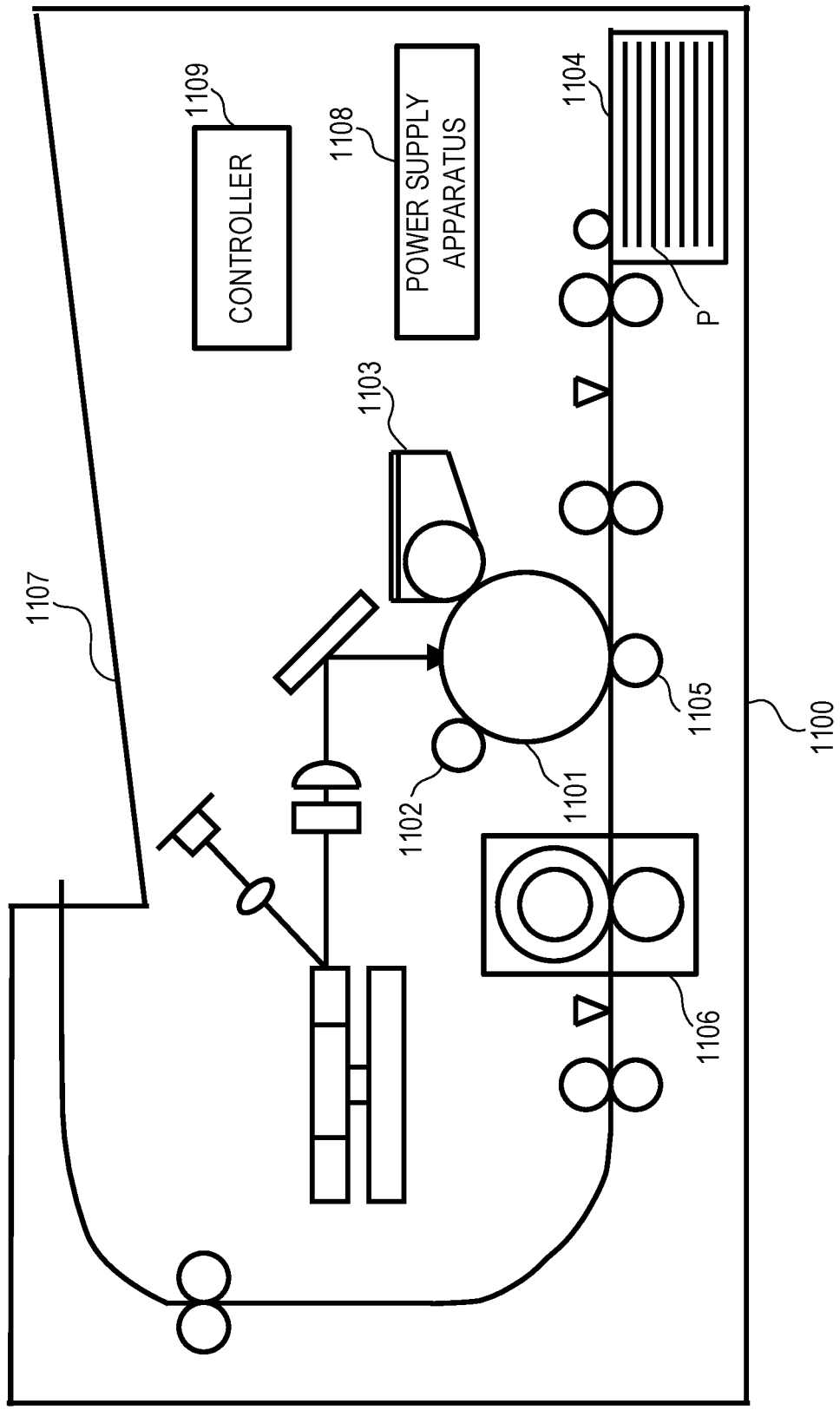
FIG. 1 is a view of an image forming apparatus according to a first and a second embodiments.

FIG. 1 is a view showing an example of a schematic configuration of an image forming apparatus. A laser beam printer 1100 (hereinafter referred to as a printer 1100) includes a photosensitive drum 1101, a charging portion 1102, and a developing portion 1103. The photosensitive drum 1101 is an image bearing member on which an electrostatic latent image is formed. The charging portion 1102 uniformly charges the photosensitive drum 1101. The developing portion 1103 develops the electrostatic latent image formed on the photosensitive drum 1101 with toner to form a toner image. A transfer unit 1105 transfers the toner image formed on the photosensitive drum 1101 (image bearing member) to a sheet P as a recording material supplied from a cassette 1104. A fixing unit 1106 fixes the unfixed toner image transferred to the sheet P. The photosensitive drum 1101, the charging portion 1102, the developing portion 1103, and the transfer portion 1105 constitute an image forming portion (an image forming unit). The sheet P on which the toner image is fixed is discharged to a tray 1107. The printer 1100 is provided with a power supply apparatus 1108. The power supply apparatus 1108 supplies power to a drive portion such as a motor and a controller 1109. The controller 1109 has a CPU (not shown) and controls an image forming operation by the image forming portion and a conveying operation for the sheet P. The image forming apparatus to which the power supply apparatus of the present invention can be applied is not limited to the configuration illustrated in FIG. 1.

[Power Supply Apparatus]

The switching power supply 100 of the first embodiment is characterized in that two rectifying/smoothing circuits configured to rectify and smooth a voltage VFWD0 induced in an auxiliary coil P2 are provided, and diodes having different responsiveness are used in the respective rectifying/smoothing circuits. The switching power supply 100 is included in the power supply apparatus 1108 provided in the printer 1100. The circuit configuration of the switching power supply 100 will be described below, and then the voltage VFWD0 induced in the auxiliary coil P2, an output voltage VFWD1 and an output voltage VFWD2 of the two rectifying/smoothing circuits will be described.

Figure 2A:
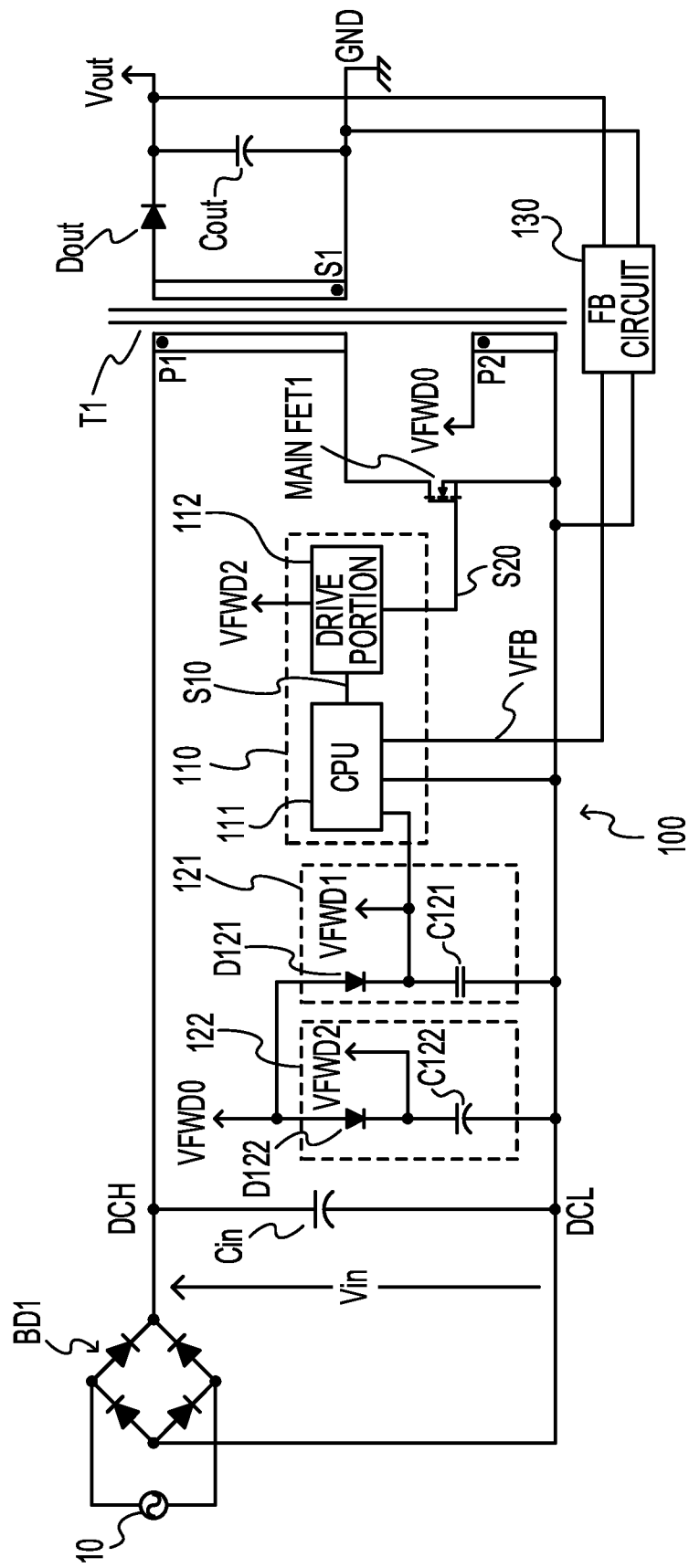
FIG. 2A is a block diagram of a switching power supply of the first embodiment.

First, the circuit configuration of the switching power supply 100 will be described with reference to FIG. 2A. The switching power supply 100 includes, on a primary side, an input smoothing capacitor Cin, an insulated transformer T1, a field-effect transistor 1 (hereinafter referred to as a main FET1) as a switching element, and a controller 110. The switching power supply 100 includes a first rectifying/smoothing circuit 121 (hereinafter simply referred to as a rectifying/smoothing circuit 121) and a second rectifying/smoothing circuit 122 (hereinafter simply referred to as a rectifying/smoothing circuit 122). The switching power supply 100 includes, on a secondary side, a diode Dout, a capacitor Cout, and a FB (feedback) circuit 130 as a feedback unit configured to feed back a voltage value of an output voltage Vout, which is a voltage on the secondary side, to the controller 110 on the primary side. The switching power supply 100 outputs the output voltage Vout to the secondary side insulated from an AC power supply 10, and controls the main FET1 so that the output voltage Vout becomes a constant voltage.

The AC voltage of the AC power supply 10 is rectified by a diode bridge BD1 and charged to the input smoothing capacitor Cin. A potential on a low side of the input smoothing capacitor Cin is denoted as DCL. A potential on a high side of the input smoothing capacitor Cin is denoted as DCH. An input voltage Vin of the switching power supply 100 is a difference between DCH and DCL.

The transformer T1 is an insulated transformer including a primary coil P1 and the auxiliary coil P2 on the primary side and a secondary coil S1 on the secondary side. Energy is supplied from the primary coil P1 of the transformer T1 to the secondary coil S1 by a switching operation of the main FET1. The voltage VFWD0, which is a forward voltage, outputted from the auxiliary coil P2 having the same polarity as the primary coil P1 is rectified and smoothed by the rectifying/smoothing circuit 121 and the rectifying/smoothing circuit 122. The number of turns of the primary coil P1 is TNP1. The number of turns of the secondary coil S1 is TNS1. The number of turns of the auxiliary coil P2 is TNP2. It should be noted that the switching power supply 100 of the first embodiment is a flyback type, so the polarity of the secondary coil S1 is opposite to that of the primary coil P1, but if the switching power supply 100 is a forward type, the polarity of the secondary coil S1 may be the same as that of the primary coil P1.

The controller 110 is a circuit configured to drive the main FET1. The controller 110 comprises a CPU 111 and a drive portion 112. The CPU 111 is, for example, an integrated general-purpose microcomputer including a calculation portion which is operated by a clock. The CPU 111 controls set values (for example, control start timing, period, on-duty) of a control signal S10, which is a PWM (pulse width modulation) signal, based on the output voltage VFWD1 outputted from the rectifying/smoothing circuit 121 and an output voltage VFB of the FB circuit 130. The control signal S10 is input to the drive portion 112. In the switching power supply 100 of the first embodiment, the main FET1 is controlled by the CPU 111 and the drive portion 112, but an analog control IC may be used instead of the CPU 111. The drive portion 112 is a circuit configured to drive the main FET1. The drive portion 112 outputs a drive signal S20 to a gate terminal of the main FET1 according to the control signal S10 input to the drive portion 112.

(Rectifying/smoothing Circuit 121: for Input Voltage Detection)

The rectifying/smoothing circuit 121 is a circuit configured to output the output voltage VFWD1 for detecting the input voltage. The rectifying/smoothing circuit 121 includes a first diode D121 (hereinafter simply referred to as a diode D121) and a first capacitor C121 (hereinafter referred to as a capacitor C121) for rectifying and smoothing the voltage VFWD0 induced in the auxiliary coil P2. The rectifying/smoothing circuit 121 outputs the output voltage VFWD1 obtained by rectifying and smoothing the forward voltage VFWD0 induced in the auxiliary coil P2 when the main FET1 performs the switching operation. A relationship between the voltage VFWD0 induced in the auxiliary coil P2 and the input voltage Vin has a relationship of Equation (1) using the number of turns TNP1 of the primary coil P1 and the number of turns TNP2 of the auxiliary coil P2. Therefore, the controller 110 can detect the voltage value of the input voltage Vin by detecting the output voltage VFWD1, which is the voltage obtained by rectifying and smoothing the voltage VFWD0.

$$VFWD0 = (TNP2/TNP1) \times Vin \qquad \text{Equation (1)}$$

(Rectifying/smoothing Circuit 122: for Power Supply Voltage)

The rectifying/smoothing circuit 122 is a circuit configured to rectify and smooth the voltage VFWD0 in the same manner as the rectifying/smoothing circuit 121. The rectifying/smoothing circuit 122 outputs the output voltage VFWD2 which is a power supply voltage to the drive portion 112. The rectifying/smoothing circuit 122 includes a second diode D122 (hereinafter simply referred to as a diode D122) and a second capacitor C122 (hereinafter simply referred to as a capacitor C122) as in the rectifying/smoothing circuit 121. However, the rectifying/smoothing circuit 122 is different from the rectifying/smoothing circuit 121 in that a responsiveness of the diode D122 is better than a responsiveness of the diode D121. A relationship between the responsiveness of the diode and the output voltage of the rectifying/smoothing circuit will be described with reference to FIG. 2B. In the switching power supply 100 of the first embodiment, the output voltage VFWD2 of the rectifying/smoothing circuit 122 is directly supplied to the drive portion 112, but a regulator circuit configured to adjust a voltage may be connected between the rectifying/smoothing circuit 122 and the drive portion 112.

In the switching power supply 100 of the first embodiment, the rectifying/smoothing circuit 121 and the rectifying/smoothing circuit 122 have the same circuit configuration. However, in order to prevent the output voltage VFWD1 of the rectifying/smoothing circuit 121 from exceeding a rated voltage for an input voltage to the CPU 111, only the rectifying/smoothing circuit 121 may be provided with a resistor configured to divide the output voltage VFWD1. In the rectifying/smoothing circuit 121, a resistor may be provided in series with the diode D121 between the diode D121 and the capacitor C121 in order to increase a time constant for charging the capacitor C121 so that the noise component can be easily removed. Further, by making a capacitance of the capacitor C122 larger than a capacitance of the capacitor C121, the rectifying/smoothing circuit 122 may easily absorb the noise component. The noise component will be described with reference to FIG. 2B.

The FB circuit 130 is a circuit configured to feed back the output voltage Vout, which is the voltage on the secondary side, of the switching power supply 100 to the controller 110 on the primary side. The FB circuit 130 is used for keeping the output voltage Vout constant. In FIG. 2A, the ground is designated by GND.

[Relationship Between Responsiveness of Diode and Output Voltage of Rectifying/Smoothing Circuit]

Figure 2B:
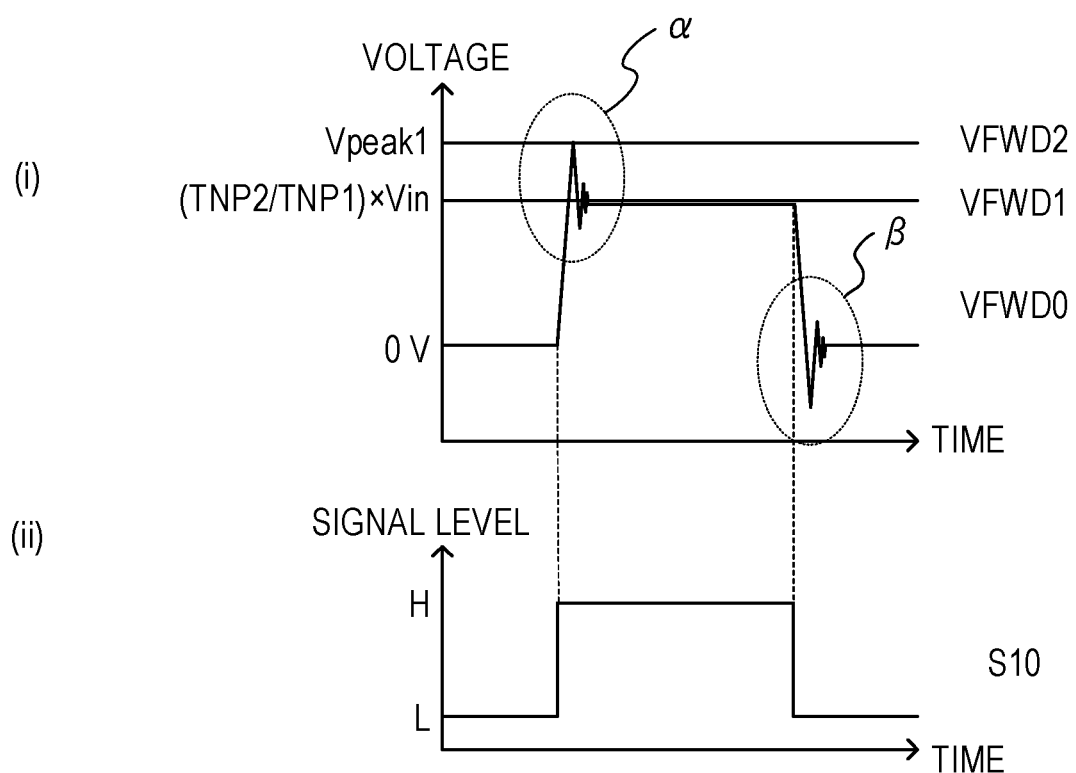
FIG. 2B is a view showing a relationship between a responsiveness of a diode and an output voltage of a rectifying/smoothing circuit.

Next, the relationship between the responsiveness of the diode and the output voltage of the rectifying/smoothing circuit will be described with reference to FIG. 2B. FIG. 2B is a view showing the control signal S10, the voltage VFWD0 induced in the auxiliary coil P2, the output voltage VFWD1 of the rectifying/smoothing circuit 121, and the output voltage VFWD2 of the rectifying/smoothing circuit 122. In the graph of (i) in FIG. 2B, time is indicated on the horizontal axis, voltage is indicated on the vertical axis, and the voltage VFWD0, the output voltage VFWD1, and the output voltage VFWD2 are indicated by solid lines. In the graph of (ii) in FIG. 2B, time is indicated on the horizontal axis and the signal level (high level (H), low level (L)) of the control signal S10 is indicated on the vertical axis.

Switching between an ON state and an OFF state of the main FET1 is controlled by the control signal S10 outputted from the CPU 111 of the controller 110. The main FET1 goes into the OFF state when the control signal S10 is at the low level. The main FET1 goes into the ON state when the control signal S10 is at the high level. Since the auxiliary coil P2 has the same polarity as the primary coil P1, the voltage VFWD0 induced in the auxiliary coil P2 becomes a value calculated by Equation (1) when the main FET1 is in the ON state (when the control signal S10 is at the high level). On the other hand, the voltage VFWD0 becomes 0V when the main FET1 is in the OFF state (when the control signal S10 is at the low level).

In the graph of (i) in FIG. 2B, there are a period in which the voltage VFWD0 is not a value calculated by Equation (1) as shown in a portion a surrounded by a broken line and a period in which the voltage VFWD0 is not 0V as shown in a portion 13 surrounded by a broken line. These are caused by the noise generated by the switching operation of the main FET1. Generally, in a switching power supply, when a main FET performs a switching operation, a pattern of a substrate or a parasitic component of an element causes noise such as a surge voltage. The noise generated by the switching operation of the main FET propagates over a wide range of the substrate due to a common impedance of the pattern and an electromagnetic field coupling between the pattern and the components. Even in the switching power supply 100, the surge voltage is generated when the main FET1, which is the main FET, is switched from the ON state to the OFF state and when the main FET1 is switched from the OFF state to the ON state, and the noise component is also superimposed on the voltage VFWD0 induced in the auxiliary coil P2. Therefore, there is a period in which the voltage VFWD0 is neither the value calculated by Equation (1) nor 0V.

The reason why the output voltages of the rectifying/smoothing circuit 121 and the rectifying/smoothing circuit 122 in the switching power supply 100 are different despite that the rectifying/smoothing circuit 121 and the rectifying/smoothing circuit 122 have the similar circuit configuration is that the diodes having different responsiveness are used. Generally, in a switching power supply, it is desired that a diode has a good responsiveness in order to realize a low power consumption. This is because a diode having a good responsiveness has excellent reverse recovery characteristics, so that loss due to reverse recovery current when the diode is switched from a conductive state to a non-conductive state is small, and power consumption in the diode is small. On the other hand, since the diode having the good responsiveness has excellent turn-on characteristics, there is a disadvantage that a noise component having a very high frequency such as a surge voltage can be rectified.

In a rectifying circuit connected to a voltage source in which a noise component is superimposed on an output voltage, when a diode having a good responsiveness is used to realize a low power consumption, an output voltage of a rectifying/smoothing circuit is increased by an amount of noise because the noise component is also rectified. Since an increase in the output voltage due to such a noise component leads to an error in voltage detection, it is desirable that the noise component is not rectified in a rectifying/smoothing circuit of which an output voltage is used for a voltage detection. Therefore, in the switching power supply 100, by making the responsiveness of the diode used in the rectifying/smoothing circuit 121 different from the responsiveness of the diode used in the rectifying/smoothing circuit 122, the rectifying/smoothing circuit 121 is prevented from rectifying the noise component, and the erroneous voltage detection in the controller 110 is prevented. That is, the reverse recovery time of the diode D121 is longer than the reverse recovery time of the diode D122, and the turn-on time of the diode D121 is longer than the turn-on time of the diode D122.

In the switching power supply 100, the responsiveness of the diode D122 of the rectifying smoothing circuit 122 is made better than the responsiveness of the diode D121 of the rectifying smoothing circuit 121, so that the rectifying/smoothing circuit 122 absorbs the noise component of the voltage VFWD0. Since the noise component is absorbed by the rectifying/smoothing circuit 122 connected in parallel to the rectifying/smoothing circuit 121, the noise component is not superimposed in the rectifying/smoothing circuit 121, and only the voltage proportional to the input voltage Vin can be rectified and outputted. On the other hand, since the noise component also is rectified in the rectifying/smoothing circuit 122, the output voltage VFWD2 of the rectifying/ smoothing circuit 122 becomes the voltage Vpeak1 higher than the output voltage VFWD1 of the rectifying/smoothing circuit 121 (VFWD2=Vpeak1>VFWD1). Unlike the output voltage VFWD1 used for detecting the input voltage Vin, the output voltage VFWD2 is used as the power supply voltage for the drive portion 112, so that the output voltage VFWD2 may be increased without affect as long as the output voltage VFWD2 increases within a range not exceeding the rated voltage of the drive portion 112. Since it is not necessary to use a diode having a low responsiveness as the diode D121 by using a diode having a high responsiveness as the diode D122, the accuracy of voltage detection can be improved without increasing the power loss in the rectifying/smoothing circuit for voltage detection. That is, the diode D121 needs to be relatively less responsiveness than the diode D122.

Unlike the circuit configuration of the present invention, a circuit configuration in which the second rectifying/smoothing circuit is not provided for the auxiliary coil and the voltage induced in the auxiliary coil is used only for detecting the input voltage is possible. In such a circuit configuration, it is possible to reduce errors in voltage detection due to switching noise of the main FET by using a diode having a low responsiveness as the diode in the sole rectifying/smoothing circuit. However, the voltage detection error is increased compared with the configuration in which the two rectifying/smoothing circuits are provided as in the present invention. This is because the noise component of the voltage VFWD0 induced in the auxiliary coil P2 is absorbed by the rectifying/smoothing circuit 122 including a diode having a good responsiveness by connecting the rectifying/smoothing circuit 121 and the rectifying/smoothing circuit 122 in parallel as in the present invention. Compared with a case in which a sole rectifying/smoothing circuit includes a diode having a low responsiveness, a case in which two rectifying/smoothing circuits are used can suppress a jump of a voltage induced in an auxiliary coil during the switching operation of the main FET by a rectifying/smoothing circuit including a diode having a high responsiveness. Therefore, the accuracy of voltage detection is better in the circuit configuration in which the two rectifying/smoothing circuits are connected in parallel as in the present invention and a diode having a good responsiveness is used in one of the two rectifying/smoothing circuits than in the circuit configuration in which a sole rectifying/smoothing circuit is provided and a diode having a low responsiveness is used in the sole rectifying/smoothing circuit. Further, since it is generally determined that a diode having a better responsiveness is a better diode, the better the responsiveness is, the greater the variety of diodes is, whereas the method of using a diode having a lower responsiveness limits the variety of diodes that can be used. Therefore, as compared with a system in which only one rectifying/smoothing circuit is provided and a diode having a low responsiveness is used, a configuration in which two rectifying/smoothing circuits including diodes having different responsiveness are provided increases the number of types of diodes that can be used.

Therefore, according to the first embodiment, the second rectifying/smoothing circuit absorbs the noise component, thereby obtaining a higher voltage detection accuracy than in the case where only one rectifying/smoothing circuit is used, and the switching power supply capable of detecting a voltage with a higher accuracy without increasing power loss can be realized.

As described above, according to the first embodiment, the accuracy of the voltage detection can be improved without increasing the power loss.

Although the voltage VFWD2 outputted from the rectifying/smoothing circuit 122 is used as the power supply voltage to the drive portion 112 in the first embodiment, the present invention is not limited thereto. For example, the voltage VFWD2 may be supplied to the CPU 111 as it is and used as the power supply voltage to the CPU 111. Alternatively, the voltage VFWD2 may be used as the power supply voltage to the CPU 111 by lowering the voltage VFWD2 through a step-down unit such as a regulator circuit while using the voltage VFWD2 as the power supply voltage to the drive portion 112. The use of the voltage VFWD2 is not limited to these, and the voltage VFWD2 may be supplied to a location other than the drive portion 112 and the CPU 111.

Second Embodiment

A switching power supply 200 of a second embodiment differs from the switching power supply 100 of the first embodiment in a polarity of an auxiliary coil of a transformer and in a feedback unit for an output voltage Vout. The switching power supply 200 is included in the power supply apparatus 1108 provided in the printer 1100. A circuit configuration of the switching power supply 200 of the second embodiment will be described below, and then a relationship between a voltage VFLB0 induced in an auxiliary coil P3 and output voltages VFLB1 and VFLB2 of two rectifying/smoothing circuits will be described. The same reference numerals are used for the same circuit configuration as that of the switching power supply 100, and the description thereof is omitted.

[Power Supply Apparatus]

Figure 3A:
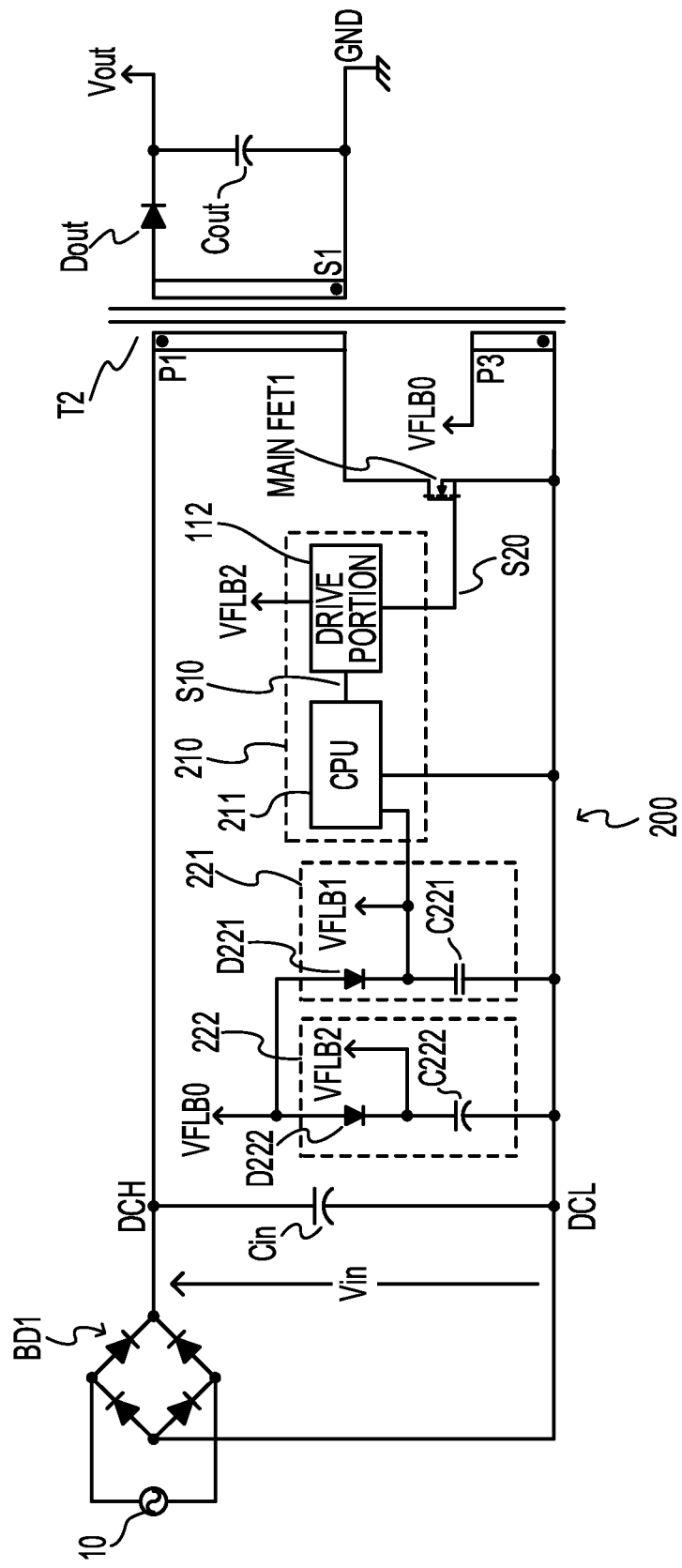
FIG. 3A is a block diagram of a switching power supply of the second embodiment.

First, the circuit configuration of the switching power supply 200 will be described with reference to FIG. 3A. A transformer T2 is an insulated transformer including a primary coil P1 and an auxiliary coil P3 on a primary side and a secondary coil S1 on a secondary side. The transformer T2 differs from the transformer T1 of the first embodiment in that the auxiliary coil P3 has a polarity opposite to that of the primary coil P1. The voltage VFLB0 induced in the auxiliary coil P3 is rectified and smoothed by a first rectifying/smoothing circuit 221 (hereinafter simply referred to as a rectifying/smoothing circuit 221) and a second rectifying/smoothing circuit 222 (hereinafter simply referred to as a rectifying/smoothing circuit 222). The number of turns of the primary coil P1 is TNP1. The number of turns of the secondary coil S1 is TNS1. The number of turns of the auxiliary coil P3 is TNP3. In the switching power supply 200 of the second embodiment, the secondary coil S1 has a polarity opposite to that of the primary coil P1 and the same as that of the auxiliary coil P3.

A controller 210 is a circuit configured to drive a main FET1. The controller 210 includes a CPU 211 and a drive portion 112. The CPU 211 is, for example, an integrated general-purpose microcomputer including a calculation portion which is operated by a clock. The CPU 211 controls a set value (for example, control start timing, period, on-duty) of a control signal S10, which is a PWM signal, based on the voltage VFLB1 outputted from the rectifying/smoothing circuit 221. The control signal S10 is input to the drive portion 112. Like the CPU 111 of the first embodiment, an analog control IC may be used instead of the CPU 211.

(Rectifying/Smoothing Circuit 221: For Output Voltage Detection)

The rectifying/smoothing circuit 221 is a circuit configured to output the voltage VFLB1 for detecting the output voltage. The rectifying/smoothing circuit 221 includes a first diode D221 (hereinafter simply referred to as a diode D221) for rectifying and smoothing the voltage VFLB0 induced in the auxiliary coil P3, and a first capacitor C221 (hereinafter simply referred to as capacitor C221). The rectifying/smoothing circuit 221 outputs the output voltage VFLB1 obtained by rectifying and smoothing a flyback voltage VFLB0 induced in the auxiliary coil P3 when the main FET1 performs a switching operation. The voltage VFLB0 induced in the auxiliary coil P3 and the output voltage Vout have a relationship of Equation (2) using the number of turns TNS1 of the secondary coil S1 and the number of turns TNP3 of the auxiliary coil P3. Therefore, the controller 210 can detect a voltage value of an output voltage Vout by detecting the output voltage VFLB1, which is the voltage obtained by rectifying and smoothing the voltage VFLB0.

$$VFLB0 = (TNP3/TNS1) \times Vout \quad \text{Equation (2)}$$

(Rectifying/Smoothing Circuit 222: For Power Supply Voltage)

The rectifying/smoothing circuit 222 is a circuit configured to rectify and smooth the voltage VFLB0 as in the rectifying/smoothing circuit 221. The rectifying/smoothing circuit 222 outputs the output voltage VFLB2 which is the power supply voltage to the drive portion 112. The rectifying/smoothing circuit 222 includes a second diode D222 (hereinafter simply referred to as a diode D222) and a second capacitor C222 (hereinafter simply referred to as a capacitor C222) as in the rectifying/smoothing circuit 221. However, the rectifying/smoothing circuit 222 is different from the rectifying/smoothing circuit 221 in that a responsiveness of the diode D222 is better than a responsiveness of the diode D221. A relationship between the responsiveness of the diode and the output voltage will be described later. In the switching power supply 200 of the second embodiment, the output voltage VFLB2 of the rectifying/smoothing circuit 222 is directly supplied to the drive portion 112, but a regulator circuit configured to adjust a voltage may be connected between the rectifying/smoothing circuit 222 and the drive portion 112. Like the first embodiment, the rectifying/smoothing circuit 221 may be provided with a voltage dividing resistor of the output voltage VFLB1 or a resistor configured to change a time constant, and a capacitance of the capacitor C222 may be made larger than a capacitance of the capacitor C221.

[Relationship between Responsiveness of Diode and Output Voltage of Rectifying/smoothing Circuit]

Figure 3B:
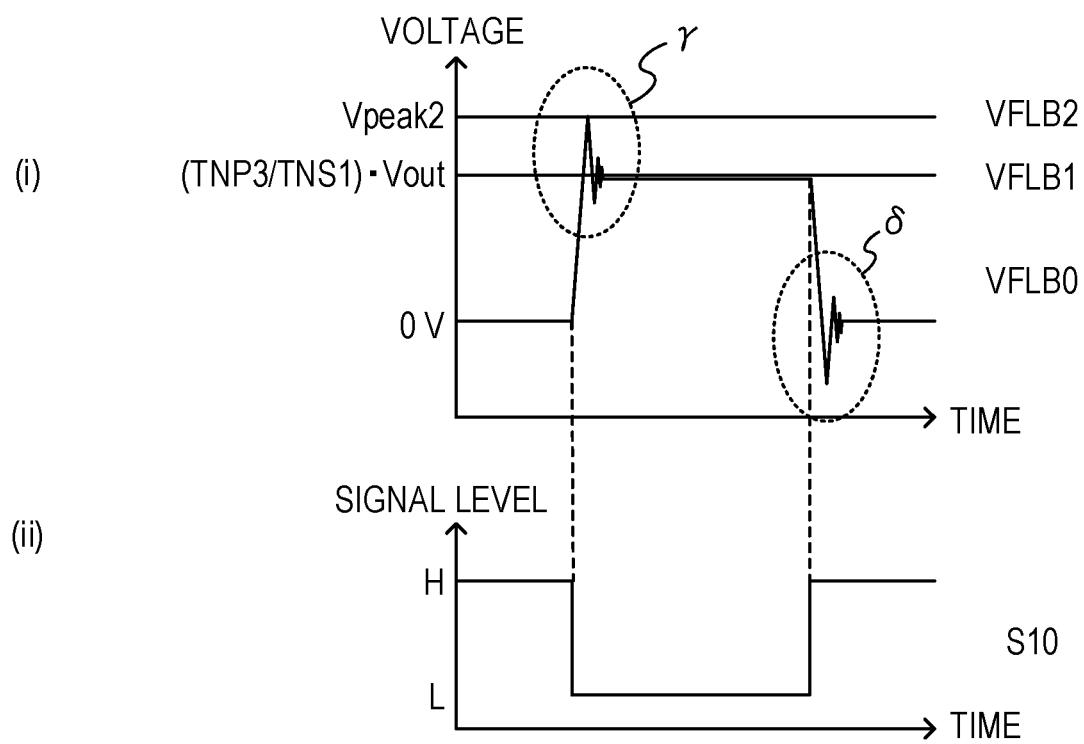
FIG. 3B is a view showing a relationship between a responsiveness of a diode and an output voltage of a rectifying/smoothing circuit.

Next, the relationship between the responsiveness of the diode and the output voltage of the rectifying/smoothing circuit will be described with reference to FIG. 3B. FIG. 3B is a view showing the control signal S10, the voltage VFLB0 induced in the auxiliary coil P3, the output voltage VFLB1 of the rectifying/smoothing circuit 221, and the output voltage VFLB2 of the rectifying/smoothing circuit 222. In the graph of (i) in FIG. 3B, time is indicated on the horizontal axis, voltage is indicated on the vertical axis, and the voltage VFLB0, the output voltage VFLB1, and the output voltage VFLB2 are indicated by solid lines. In the graph of (ii) in FIG. 3B, time is indicated on the horizontal axis and the signal level (high level (H), low level (L)) of the control signal 10 is indicated on the vertical axis.

Switching between the ON state and the OFF state of the main FET1 is controlled by the control signal S10 outputted from the CPU 211 of the controller 210. The main FET1 goes into the OFF state when the control signal S10 is at the low level. The main FET1 goes into the ON state when the control signal S10 is at the high level. Since the auxiliary coil P3 has a polarity opposite to that of the primary coil P1, the voltage VFLB0 induced by the auxiliary coil P3 becomes a value calculated by Equation (2) when the main FET1 is in the OFF state (when the control signal S10 is at the low level). On the other hand, the voltage FFLB0 becomes 0V when the main FET1 is in the ON state (when the control signal S10 is at the high level). In the voltage VFLB0 shown in FIG. 3B, there is a period in which the voltage VFLB0 is not 0V or the voltage VFLB0 is not a value calculated by Equation (2). This is caused by the switching noise of the main FET1 as with the voltage VFWD0 described with reference to FIG. 2B. In the graph of (i) in FIG. 3B, the noise components due to the switching noise of the main FET1 are shown in portions surrounded by the dashed circles γ and δ.

The reason why the output voltages of the rectifying/smoothing circuit 221 and the rectifying/smoothing circuit 222 in the switching power supply 200 are different is that diodes having different responsiveness are used, which is the same reason as that of the switching power supply 100 of the first embodiment. That is, even in the rectifying/smoothing circuit 222, the diode D222 having the good responsiveness also rectifies the noise component. Therefore, the output voltage VFLB2 of the rectifying/smoothing circuit 222 becomes the voltage Vpeak2 higher than the output voltage VFLB1 of the rectifying/smoothing circuit 221 (VFLB2=Vpeak2>VFLB1).

The reason why the voltage should be accurately detected by the rectifying/smoothing circuit 221 is to realize the size reduction and cost reduction of the substrate. In a switching power supply configured to generate a DC voltage from a commercial AC power supply, the output voltage must be fed back to the primary side in order to keep the output voltage constant, but the primary side and the secondary side must be insulated. Therefore, an element such as an insulated transformer or a photocoupler is required for the switching power supply. On the other hand, since size reduction and cost reduction of a substrate are generally required for a switching power supply, it is desirable not to provide unnecessary elements. In the switching power supply configured to generate the DC voltage from the commercial AC power supply, the insulated transformer is indispensable as a power transmission unit configured to transmit power from the primary side to the secondary side. On the other hand, since an insulating element using light such as the photocoupler is only a primary side and a secondary side information transmission unit, it is advantageous in terms of size reduction and cost reduction of the substrate if the insulating element is not used. Therefore, in order to reduce the size and cost of the substrate, there are cases in which a dedicated feedback circuit using a photocoupler is omitted and the output voltage is fed back by an auxiliary coil of an insulated transformer configured to transmit power. However, even in the case in which the dedicated feedback circuit is omitted, the accuracy of the output voltage cannot be reduced in many cases, so that it is necessary to improve the accuracy of the voltage detection in the auxiliary coil.

Since the switching power supply 200 of the second embodiment does not have a FB circuit, the substrate can be reduced in size as compared with the switching power supply 100 of the first embodiment having the dedicated FB circuit. Further, the rectifying/smoothing circuit 222 using the diode having good responsiveness which is less expensive and smaller than an element such as a photocoupler is connected in parallel to the rectifying/smoothing circuit 221 for detecting the output voltage Vout. Thus, in the switching power supply 200, high-precision voltage detection can be realized without increasing the power loss caused by the rectifying/smoothing circuit. Further, by using the output voltage VFLB2 of the rectifying/smoothing circuit 222 as the power supply voltage to the drive portion 112, a power supply voltage generating circuit of the primary circuit can be omitted, and further size reduction of the substrate is expected.

Therefore, according to the second embodiment, the second rectifying/smoothing circuit 222 absorbs the noise component, thereby obtaining the voltage detection accuracy higher than that in the case where there is only one rectifying/smoothing circuit. In addition, the switching power supply capable of detecting voltage with high accuracy without increasing power loss can be realized. As described above, according to the second embodiment, the accuracy of the voltage detection can be improved without increasing the power loss.

Although the voltage VFLB2 outputted from the rectifying/smoothing circuit 222 is used as the power supply voltage to the drive portion 112 in the second embodiment, the present invention is not limited thereto. For example, the voltage VFLB2 may be supplied to the CPU 211 as it is and used as the power supply voltage to the CPU 211. Alternatively, the voltage VFLB2 may be used as the power supply voltage to the CPU 211 by lowering the voltage VFLB2 via a step-down unit such as a regulator circuit while using the voltage VFLB2 as the power supply voltage to the drive portion 112. The use of the voltage VFLB2 is not limited to these, and the voltage VFLB2 may be supplied to a location other than the drive portion 112 and the CPU 211.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-081568, filed May 13, 2021, which is hereby incorporated by reference herein in its entirety.

What is claimed is:

1. A power supply apparatus, comprising:
    a transformer including a primary coil, a secondary coil, and an auxiliary coil;
    a switching element connected in series to the primary coil;
    a first rectifying/smoothing circuit including a first diode and a first capacitor and configured to rectify and smooth a voltage induced in the auxiliary coil;
    a second rectifying/smoothing circuit including a second diode and a second capacitor, connected in parallel with the first rectifying/smoothing circuit, and configured to rectify and smooth the voltage induced in the auxiliary coil; and
    a controller configured to control the switching element,
    wherein the controller is configured to detect the voltage induced in the auxiliary coil based on an output voltage of the first rectifying/smoothing circuit, and
    wherein a reverse recovery time of the first diode is longer than a reverse recovery time of the second diode.

2. The power supply apparatus according to claim 1, wherein the auxiliary coil has the same polarity as the primary coil, and
    wherein the controller is configured to detect a voltage input to the primary coil based on the voltage induced in the auxiliary coil.

3. The power supply apparatus according to claim 1, further comprising a feedback unit configured to feed back a voltage outputted from the secondary coil to the controller.

4. The power supply apparatus according to claim 1, wherein the secondary coil has a polarity opposite to a polarity of the primary coil,
    wherein the auxiliary coil has a polarity opposite to the polarity of the primary coil, and
    wherein the controller is configured to detect a voltage outputted from the secondary coil based on the voltage induced in the auxiliary coil.

5. The power supply apparatus according to claim 1, wherein the second capacitor has a capacitance larger than a capacitance of the first capacitor.

6. The power supply apparatus according to claim 1, wherein a turn-on time of the first diode is longer than a turn-on time of the second diode.

7. The power supply apparatus according to claim 1, further comprising a drive portion configured to drive the switching element,
    wherein the second rectifying/smoothing circuit is configured to generate a power supply voltage to be supplied to the drive portion.

8. The power supply apparatus according to claim 1, wherein the second rectifying/smoothing circuit is configured to generate a power supply voltage to be supplied to the controller.

9. An image forming apparatus comprising:
    an image forming unit configured to form an image on a recording material; and
    a power supply apparatus configured to supply power to the image forming unit, the power supply apparatus comprising:
        a transformer including a primary coil, a secondary coil, and an auxiliary coil,
        a switching element connected in series to the primary coil,
        a first rectifying/smoothing circuit including a first diode and a first capacitor and configured to rectify and smooth a voltage induced in the auxiliary coil,
        a second rectifying/smoothing circuit including a second diode and a second capacitor, connected in parallel with the first rectifying/smoothing circuit, and configured to rectify and smooth the voltage induced in the auxiliary coil, and
        a controller configured to control the switching element,
        wherein the controller is configured to detect the voltage induced in the auxiliary coil based on an output voltage of the first rectifying/smoothing circuit, and
        wherein a reverse recovery time of the first diode is longer than a reverse recovery time of the second diode.

10. The image forming apparatus according to claim 9, wherein the auxiliary coil has the same polarity as the primary coil, and
    wherein the controller is configured to detect a voltage input to the primary coil based on the voltage induced in the auxiliary coil.

11. The image forming apparatus according to claim 9, further comprising a feedback unit configured to feed back a voltage outputted from the secondary coil to the controller.

12. The image forming apparatus according to claim 9, wherein the secondary coil has a polarity opposite to a polarity of the primary coil,
wherein the auxiliary coil has a polarity opposite to the polarity of the primary coil, and
wherein the controller is configured to detect a voltage outputted from the secondary coil based on the voltage induced in the auxiliary coil.

13. The image forming apparatus according to claim 9, wherein the second capacitor has a capacitance larger than a capacitance of the first capacitor.

14. The image forming apparatus according to claim 9, wherein a turn-on time of the first diode is longer than a turn-on time of the second diode.

15. The image forming apparatus according to claim 9, further comprising a drive portion configured to drive the switching element,
wherein the second rectifying/smoothing circuit is configured to generate a power supply voltage to be supplied to the drive portion.

16. The image forming apparatus according to claim 9, wherein the second rectifying/smoothing circuit is configured to generate a power supply voltage to be supplied to the controller.

17. A power supply apparatus, comprising:
a transformer including a primary coil, a secondary coil, and an auxiliary coil;
a switching element connected in series to the primary coil;
a first rectifying/smoothing circuit including a first diode and a first capacitor and configured to rectify and smooth a voltage induced in the auxiliary coil;
a second rectifying/smoothing circuit including a second diode and a second capacitor, connected in parallel with the first rectifying/smoothing circuit, and configured to rectify and smooth the voltage induced in the auxiliary coil; and
a controller configured to control the switching element,
wherein the controller is configured to detect the voltage induced in the auxiliary coil based on an output voltage of the first rectifying/smoothing circuit, and
wherein a turn-on time of the first diode is longer than a turn-on time of the second diode.

18. The power supply apparatus according to claim 17, wherein the auxiliary coil has the same polarity as the primary coil, and
wherein the controller is configured to detect a voltage input to the primary coil based on the voltage induced in the auxiliary coil.

19. The power supply apparatus according to claim 17, further comprising a feedback unit configured to feed back a voltage outputted from the secondary coil to the controller.

20. The power supply apparatus according to claim 17, wherein the secondary coil has a polarity opposite to a polarity of the primary coil,
wherein the auxiliary coil has a polarity opposite to the polarity of the primary coil, and
wherein the controller is configured to detect a voltage outputted from the secondary coil based on the voltage induced in the auxiliary coil.

21. The power supply apparatus according to claim 17, wherein the second capacitor has a capacitance larger than a capacitance of the first capacitor.

22. The power supply apparatus according to claim 17, further comprising a drive portion configured to drive the switching element,
wherein the second rectifying/smoothing circuit is configured to generate a power supply voltage to be supplied to the drive portion.

23. The power supply apparatus according to claim 17, wherein the second rectifying/smoothing circuit is configured to generate a power supply voltage to be supplied to the controller.

24. An image forming apparatus comprising:
an image forming unit configured to form an image on a recording material; and
a power supply apparatus configured to supply power to the image forming unit, the power supply apparatus comprising:
a transformer including a primary coil, a secondary coil, and an auxiliary coil,
a switching element connected in series to the primary coil,
a first rectifying/smoothing circuit including a first diode and a first capacitor and configured to rectify and smooth a voltage induced in the auxiliary coil,
a second rectifying/smoothing circuit including a second diode and a second capacitor, connected in parallel with the first rectifying/smoothing circuit, and configured to rectify and smooth the voltage induced in the auxiliary coil, and
a controller configured to control the switching element,
wherein the controller is configured to detect the voltage induced in the auxiliary coil based on an output voltage of the first rectifying/smoothing circuit, and
wherein a turn-on time of the first diode is longer than a turn-on time of the second diode.

25. The image forming apparatus according to claim 24 wherein the auxiliary coil has the same polarity as the primary coil, and
wherein the controller is configured to detect a voltage input to the primary coil based on the voltage induced in the auxiliary coil.

26. The image forming apparatus according to claim 24, further comprising a feedback unit configured to feed back a voltage outputted from the secondary coil to the controller.

27. The image forming apparatus according to claim 24, wherein the secondary coil has a polarity opposite to a polarity of the primary coil,
wherein the auxiliary coil has a polarity opposite to the polarity of the primary coil, and
wherein the controller is configured to detect a voltage outputted from the secondary coil based on the voltage induced in the auxiliary coil.

28. The image forming apparatus according to claim 24, wherein the second capacitor has a capacitance larger than a capacitance of the first capacitor.

29. The image forming apparatus according to claim 24, further comprising a drive portion configured to drive the switching element,
wherein the second rectifying/smoothing circuit is configured to generate a power supply voltage to be supplied to the drive portion.

30. The image forming apparatus according to claim 24, wherein the second rectifying/smoothing circuit is configured to generate a power supply voltage to be supplied to the controller.

* * * * *